US010640594B2

(12) United States Patent
Minami et al.

(10) Patent No.: US 10,640,594 B2
(45) Date of Patent: May 5, 2020

(54) FLUORINE-CONTAINING COMPOSITION AND FLUORINE-CONTAINING POLYMER

(71) Applicant: DAIKIN INDUSTRIES, LTD., Osaka-shi, Osaka (JP)

(72) Inventors: Shinichi Minami, Shanghai (CN); Masaki Fukumori, Settsu (JP); Tetsuya Uehara, Settsu (JP); Hisako Nakamura, Settsu (JP); Ikuo Yamamoto, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 172 days.

(21) Appl. No.: 14/369,425

(22) PCT Filed: Dec. 12, 2012

(86) PCT No.: PCT/JP2012/082220
§ 371 (c)(1),
(2) Date: Jun. 27, 2014

(87) PCT Pub. No.: WO2013/099611
PCT Pub. Date: Jul. 4, 2013

(65) Prior Publication Data
US 2014/0364028 A1    Dec. 11, 2014

(30) Foreign Application Priority Data

Dec. 28, 2011  (JP) ................. 2011-288080

(51) Int. Cl.
| | | |
|---|---|---|
| *C08F 220/18* | (2006.01) |
| *C08L 33/16* | (2006.01) |
| *C08F 220/24* | (2006.01) |
| *D06M 15/277* | (2006.01) |
| *D06M 15/263* | (2006.01) |
| *C08K 3/20* | (2006.01) |

(52) U.S. Cl.
CPC .......... *C08F 220/18* (2013.01); *C08F 220/24* (2013.01); *C08K 3/20* (2013.01); *C08L 33/16* (2013.01); *D06M 15/263* (2013.01); *D06M 15/277* (2013.01); *D06M 2200/12* (2013.01); *Y10T 442/2172* (2015.04)

(58) Field of Classification Search
CPC .... C08F 220/18; C08F 220/24; C08F 220/68; C08L 33/16; D06M 23/02; Y10T 442/2172
USPC ........................................... 442/80
See application file for complete search history.

(56) References Cited

U.S. PATENT DOCUMENTS

| | | | | |
|---|---|---|---|---|
| 4,259,407 | A * | 3/1981 | Tada et al. ................... | 428/421 |
| 5,021,501 | A | 6/1991 | Ohmori et al. | |
| 5,021,527 | A | 6/1991 | Ohmori et al. | |
| 5,069,941 | A | 12/1991 | Ohmori et al. | |
| 2007/0100064 | A1* | 5/2007 | Fukumori et al. ............ | 524/556 |
| 2007/0202761 | A1* | 8/2007 | Yamamoto ............ | C07C 229/30 442/94 |
| 2010/0113665 | A1 | 5/2010 | Hirono et al. | |

FOREIGN PATENT DOCUMENTS

| | | |
|---|---|---|
| CN | 102277741 A | 12/2011 |
| JP | 63-99285 A | 4/1988 |
| JP | 01-315471 A | 12/1989 |
| WO | 2009/008514 A1 | 1/2009 |
| WO | 2010/030044 A2 | 3/2010 |
| WO | 2011062292 A1 | 5/2011 |
| WO | 2011/122442 A1 | 10/2011 |

OTHER PUBLICATIONS

International Preliminary Report on Patentability including the Written Opinion of the International Searching Authority dated Jul. 10, 2014 for corresponding PCT/JP2012/082220.
Liu et al., "Research advances in the modification of PMMA," New Chemical Materials, 2009, vol. 37, No. 1, pp. 5-7 (3 total pages).
David Deegan, "EPA Intensifies Scientific Investigation of a Chemical Processing Aid", Environmental News, Apr. 14, 2013.
EPA, "Perfluorooctanoic Acid Fluorinated Telomers; Request for Comment, Solicitation of Interested Parties for Enforceable Consent Agreement Development, and Notice of Public Meeting", Federal Registrer, Apr. 16, 2003, vol. 68, No. 73.
EPA OPPT Fact Sheet, Apr. 14, 2003.
U.S. Environmental Protection Agency Office of Pollution Prevention and Toxics, "Preliminary Risk Assessment of the Developmental Toxicity Associated with Exposure to Perfluorooctanoic Acid and Its Salts", Apr. 10, 2003.
International Search Report for PCT/JP2012/082220, dated Mar. 19, 2013.
Communication dated Jul. 13, 2015, issued by the European Patent Office in counterpart Application No. 12863128.0.

* cited by examiner

*Primary Examiner* — Vincent Tatesure
(74) *Attorney, Agent, or Firm* — Sughrue Mion, PLLC

(57) ABSTRACT

Disclosed is a fluorine-containing composition which contains a fluorine-containing polymer that has repeating units respectively derived from (A) a fluorine-containing monomer that is an alpha-chloroacrylate having a fluoroalkyl group, (B) a monomer that has a linear or branched hydrocarbon group but does not have a fluoroalkyl group, and (C) a monomer that has a cyclic hydrocarbon group but does not have a fluoroalkyl group. This fluorine-containing composition is capable of providing a base such as a fiber product with excellent water repellency, especially strong water repellency.

18 Claims, No Drawings

FLUORINE-CONTAINING COMPOSITION AND FLUORINE-CONTAINING POLYMER

CROSS REFERENCE TO RELATED APPLICATIONS

This application is a National Stage of International Application No. PCT/JP2012/082220, filed Dec. 12, 2012, claiming priority from Japanese Patent Application No. 2011-288080, filed Dec. 28, 2011, the contents of all of which are incorporated herein by reference in their entirety.

TECHNICAL FIELD

The present invention relates to a fluorine-containing composition (a fluorine-containing treatment composition), particularly a surface treatment composition such as a water- and oil-repellent composition. The composition of the present invention can be used to give excellent water repellency, oil repellency, and soil resistance to a textile (for example, a carpet), a paper, a non-woven fabric, a masonry, an electrostatic filter, a dust protective mask, and a part of fuel cell.

BACKGROUND ART

Hitherto, various fluorine-containing compounds have been proposed. The fluorine-containing compounds have the advantageous effects of having properties excellent in heat resistance, oxidation resistance, weather resistance and the like. The fluorine-containing compounds are used as, for example, a water- and oil-repellent agent and a soil resistant agent by utilizing the properties that the fluorine-containing compounds have low free energy, i.e., difficulty in adherence. For example, U.S. Pat. No. 5,247,008 describes finishing agents for textiles, leather, paper and mineral substrates, which are aqueous dispersions of a copolymer of a perfluoroalkyl acrylate or methacrylate, an alkyl acrylate or methacrylate and an aminoalkyl acrylate or methacrylate.

The fluorine-containing compounds which can be used as the water- and oil-repellent agent include a fluorine-containing polymer which comprises (meth)acrylate ester having a fluoroalkyl group as a constituent monomer. Various recent research results indicate that in view of the practical treatment of fibers with the surface treatment agent, the important surface property is not a static contact angle, but is a dynamic contact angle, particularly a reversing contact angle. That is, the advancing contact angle of water is not dependent on the carbon number of the fluoroalkyl side chain, but the reversing contact angle of water in the case of carbon number of at most 7 is remarkably low than that in the case of carbon number of at least 8. In correspondence to this, an X-ray analysis shows that the side chain crystallizes when the carbon number of side chain is at least 7. It is known that the actual water repellency has relationship with the crystallization of the side chain and that mobility of the surface treatment agent molecules is an important factor for expression of the actual performances (for example, MAEKAWA Takashige, FINE CHEMICAL, Vol. 23, No. 6, page 12 (1994)). Accordingly, it has been believed that the acrylate polymer having low carbon number of fluoroalkyl group in the side chain which is at most 7 (particularly at most 6) has low crystallinity so that the polymer cannot satisfy the actual performances (particularly water repellency).

Recent study results (EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)) and the like clarify that a PFOA (perfluorooctanoic acid) doubtfully has a potential risk of environmental load. EPA (Environmental Protection Agency of USA) announced on Apr. 14, 2003 that the EPA intensifies the scientific investigation on PFOA.

On the other hand, Federal Register (FR Vol. 68, No. 73/Apr. 16, 2003 [FRL-2303-8]) (http://www.epa.gov/opptintr/pfoa/pfoafr.pdf), EPA Environmental News for release Monday April, 2003 "EPA INTENSIFIES SCIENTIFIC INVESTIGATION OF A CHEMICAL PROCESSING AID" (http://wvvw.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a "telomer" may possibly metabolize or decompose to PFOA. It is also announced that the "telomer" is used in a large number of commercial products including fire fighting foams, care products and cleaning products as well as soil, stain and grease resistant coating on carpets, textiles, paper, and leather.

WO2010/030044 discloses a treatment composition comprising a fluorine-containing polymer which has repeating units derived from a fluorine-containing monomer, and a (meth)acrylate monomer having a cyclic hydrocarbon group. WO2011/122442 discloses a treatment composition comprising a fluorine-containing polymer which has repeating units derived from alpha-chloroacrylate, and a (meth)acrylate monomer having a hydrocarbon group. Strong water repellency is not studied in these gazettes.

PRIOR ART DOCUMENTS

Patent Documents

Patent Document 1: WO2010/030044
Patent Document 2: WO2011/122442

DISCLOSURE OF THE INVENTION

Problems to be Solved by the Invention

One of objects of the present invention is to provide a fluorine-containing composition and a fluorine-containing polymer which give excellent water- and oil-repellency to substrates, such as textiles, and have excellent prevention of polymer adhesion to a roll in a processing treatment.

Another of the objects of the present invention is to provide a treatment composition which can give excellent water repellency, especially strong water repellency, to substrates, such as textiles.

Means for Solving the Problems

The present invention provides a fluorine-containing composition comprising a fluorine-containing polymer which comprises:
(A) repeating units derived from a fluorine-containing monomer which is alpha-chloroacrylate having a fluoroalkyl group,
(B) repeating units derived from a monomer which is free from a fluoroalkyl group and which has a linear or branched hydrocarbon group, and
(C) repeating units derived from a monomer which is free from a fluoroalkyl group and which has a cyclic hydrocarbon group.

Effects of the Invention

According to the present invention, excellent water- and oil-repellency can be given to substrates such as textiles, and adhesion of the polymer to a roll can be prevented in a treatment process of substrates. The fluorine-containing composition the present invention gives good results in a strong water-repellency test.

According to the present invention, excellent water repellency, especially excellent strong water repellency, can be given to substrates such as textiles.

MODES FOR CARRYING OUT THE INVENTION

The present invention uses (A) the fluorine-containing monomer (alpha-chloro-substituted fluorine-containing monomer), (B) the linear or branched hydrocarbon group-containing monomer, and (C) the cyclic hydrocarbon group-containing monomer.

The fluorine-containing polymer of the present invention has:
(A) repeating units derived from a fluorine-containing monomer (alpha-chloro-substituted fluorine-containing monomer),
(B) repeating units derived from a linear or branched hydrocarbon group-containing monomer, and
(C) repeating units derived from a cyclic hydrocarbon group-containing monomer.

Generally, some (preferably all) monomers (for example, the monomers (A), (B) and (C)) used in the present invention have a carbon-carbon double bond (an ethylenically unsaturated double bond).

The fluorine-containing polymer of the present invention may consist of repeating units derived from the monomer (A), the monomer (B) and the monomer (C); or may have repeating units derived from other monomer(s) in addition to repeating units derived from the monomer (A), the monomer (B) and the monomer (C).

(A) Fluorine-containing Monomer (Alpha-chloro-substituted Fluorine-containing Monomer)

The "alpha-chloro-substituted fluorine-containing monomer" means a compound which has a carbon-carbon double bond (an ethylenically unsaturated double bond) wherein a chlorine atom is bonded to a carbon atom which is not a molecule end carbon atom in the carbon-carbon double bond (ethylenically unsaturated double bond). Generally, the carbon-carbon double bond directly bonds with a carbonyl group.

The fluorine-containing monomer is a fluorine-containing monomer represented by the formula:

$$CH_2=C(-Cl)-C(=O)-Y-Z-Rf$$

wherein
Y is —O— or —NH—;
Z is a direct bond or divalent organic group; and
Rf is a fluoroalkyl group having 1 to 20 carbon atoms.

Preferably, the fluorine-containing monomer is an acrylate ester wherein Y group is —O—.

The Z group may be, specifically, a linear or branched aliphatic group having 1-20 carbon atoms (for example, 1-10 carbon atoms, particularly 1-4 carbon atoms, especially 1 or 2 carbon atoms) (for example, alkylene group), such as a group represented by the formula $-(CH_2)_x-$ wherein x is 1 to 10,
an aromatic group or cycloaliphatic group having 6-18 carbon atoms,
a group represented by the formula $-R^2(R^1)N-SO_2-$ or the formula $-R^2(R^1)N-CO-$ wherein $R^1$ is an alkyl group having 1 to 10 carbon atoms and $R^2$ is a linear alkylene group or branched alkylene group having 1 to 10 carbon atoms, for example, by a $-CH_2CH_2N(R^1)SO_2-$ group wherein $R^1$ is an alkyl group having 1 to 4 carbon atoms, a group represented by the formula $-CH_2CH(OR^3)CH_2-[Ar-(O)_q]_p-$ wherein $R^3$ is a hydrogen atom or an acyl group having 1 to 10 carbon atoms (for example, formyl group or acetyl group), Ar is an arylene group (for example, a phenylene group) optionally having a substituent group, p is 0 or 1, and q is 0 or 1,
a group represented by the formula $-(CH_2)_n-Ar-(O)_q-$ (wherein Ar is an arylene group (for example, phenylene group) optionally having a substituent group, n is 0-10, and q is 0 or 1), or
a $-(CH_2)_m-SO_2-(CH_2)_n-$ group or a $-(CH_2)_m-S-(CH_2)_n-$ group wherein m is 1-10, and n is 0-10.

The aromatic group or the cycloaliphatic group may be substituted or unsubstituted. The S group or the $SO_2$ group may be directly bonded to the Rf group.

Preferably, Z is a direct bond, an aliphatic group having 1 to 10 carbon atoms, an aromatic, araliphatic or cycloaliphatic group having 6 to 18 carbon atoms, a $-CH_2CH_2N(R^1)SO_2-$ group (wherein $R^1$ is an alkyl group having 1 to 4 carbon atoms) or a $-CH_2CH(OZ^1)CH_2-$ group (wherein $Z^1$ is a hydrogen atom or an acetyl group) or a $-(CH_2)_m-SO_2-(CH_2)_n-$ group or a $-(CH_2)_m-S-(CH_2)_n-$ group (wherein m is 1 to 10, and n is 0 to 10). The aliphatic group is preferably an alkylene group (having particularly 1 to 4, for example, 1 or 2 carbon atoms).

The Rf group is preferably a perfluoroalkyl group. The carbon number of the Rf group is preferably from 1 to 12, for example, 1 to 6, particularly from 4 to 6. Examples of the Rf group include $-CF_3$, $-CF_2CF_3$, $-CF_2CF_2CF_3$, $-CF(CF_3)_2$, $-CF_2CF_2CF_2CF_3$, $-CF_2CF(CF_3)_2$, $-C(CF_3)_3$, $-(CF_2)_4CF_3$, $-(CF_2)_2CF(CF_3)_2$, $-CF_2C(CF_3)_3$, $-CF(CF_3)CF_2CF_2CF_3$, $-(CF_2)_5CF_3$, $-(CF_2)_3CF(CF_3)_2$, $-(CF_2)_4CF(CF_3)_2$ and $-C_8F_{17}$.

Specific examples of the fluorine-containing monomer (a) include, but are not limited to, the following:

$CH_2=C(-Cl)-C(=O)-O-(CH_2)_2-Rf$
$CH_2=C(-Cl)-C(=O)-O-(CH_2)_4-Rf$
$CH_2=C(-Cl)-C(=O)-O-(CH_2)_2-S-Rf$
$CH_2=C(-Cl)-C(=O)-O-(CH_2)_2-S-(CH_2)_2-Rf$
$CH_2=C(-Cl)-C(=O)-O-(CH_2)_2-SO_2-Rf$
$CH_2=C(-Cl)-C(=O)-O-(CH_2)_2-SO_2-(CH_2)_2-Rf$
$CH_2=C(-Cl)-C(=O)-NH-(CH_2)_2-Rf$
$CH_2=C(-Cl)-C(=O)-O-(CH_2)_3-S-Rf$
$CH_2=C(-Cl)-C(=O)-O-(CH_2)_3-S-(CH_2)_2-Rf$
$CH_2=C(-Cl)-C(=O)-O-(CH_2)_3-SO_2-Rf$
$CH_2=C(-Cl)-C(=O)-O-(CH_2)_3-SO_2-(CH_2)_2-Rf$
$CH_2=C(-Cl)-C(=O)-O-CH_2CH_2N(CH_3)SO_2-Rf$
$CH_2=C(-Cl)-C(=O)-O-CH_2CH(OCOCH_3)CH_2-Rf$
$CH_2=C(-Cl)-C(=O)-O-CH_2-Ph-O-Rf$ (wherein Ph is 1,4-phenylene group.)
$CH_2=C(-Cl)-C(=O)-O-CH_2CH(OH)CH_2-Ph-O-Rf$
$CH_2=C(-Cl)-C(=O)-O-CH_2-Ph-Rf$
$CH_2=C(-Cl)-C(=O)-O-CH_2CH(OCOCH_3)CH_2-Ph-Rf$ wherein Rf is a fluoroalkyl group having 1 to 20 carbon atoms.

(B) Monomer Having a Linear or Branched Hydrocarbon Group

The monomer (B) is a monomer which does not have a fluoroalkyl group and which has a carbon-carbon double bond (an ethylenically unsaturated double bond). The monomer (B) does not have a cyclic hydrocarbon group. Generally, the monomer (B) is a monomer which does not contain a fluorine atom. Especially, the linear or branched hydrocarbon group may be a linear hydrocarbon group. Preferably, the linear or branched hydrocarbon group has 1-30 carbon atoms and, generally, is a saturated aliphatic hydrocarbon group, especially an alkyl group. Preferably, the monomer (B) is (meth)acrylates, vinyl ethers, or vinyl esters.

The monomer (B) may be a (meth)acrylate ester having an alkyl group, especially alkyl (meth)acrylate ester. The number of carbon atoms of an alkyl group may be 1-30, for example, 12-22, especially 14-20. For example, the monomer (B) having a linear or branched hydrocarbon group may be an acrylate of the formula:

wherein $A^1$ is a hydrogen atom, a methyl group, or a halogen atom (for example, a chlorine atom, a bromine atom, and an iodine atom) other than a fluorine atom, and
$A^2$ is an alkyl group represented by $C_nH_{2n+1}$ (n is 1-30, especially 12-22).

Especially preferable examples of the monomer (B) include lauryl (meth)acrylate, cetyl (meth)acrylate, stearyl (meth)acrylate, and behenyl (meth)acrylate.

(C) Monomer Having a Cyclic Hydrocarbon Group

The monomer having a cyclic hydrocarbon group is a monomer which has a cyclic hydrocarbon group and a carbon-carbon double bond (an ethylenically unsaturated double bond). Preferably, the monomer having a cyclic hydrocarbon group is (meth)acrylate having a cyclic hydrocarbon group. The monomer having a cyclic hydrocarbon group (C) does not have a fluoroalkyl group. Generally, the monomer having a cyclic hydrocarbon group (C) is a monomer which does not contain a fluorine atom. The (meth)acrylate having a cyclic hydrocarbon group is a compound having a (preferably monovalent) cyclic hydrocarbon group and a monovalent (meth)acrylate group. The monovalent cyclic hydrocarbon group directly bonds to the monovalent (meth)acrylate group. Examples of the cyclic hydrocarbon group include a saturated or unsaturated, monocyclic group, polycyclic group or bridged ring group. The cyclic hydrocarbon group is preferably a saturated group. The cyclic hydrocarbon group preferably has 4 to 20 carbon atoms. Examples of the cyclic hydrocarbon group include a cycloaliphatic group having 4 to 20 carbon atoms, particularly 5 to 12 carbon atoms, an aromatic group having 6 to 20 carbon atoms, and an araliphatic group having 7 to 20 carbon atoms. The number of carbon atoms in the cyclic hydrocarbon group is particularly preferably at most 15, for example, at most 10. A carbon atom in the cyclic hydrocarbon group is preferably directly bonded to an ester group in the (meth)acrylate group. The cyclic hydrocarbon group is preferably a saturated cycloaliphatic group. Specific examples of the cyclic hydrocarbon group include a cyclohexyl group, a t-butyl cyclohexyl group, an isobornyl group, a dicyclopentanyl group and a dicyclopentenyl group. The (meth)acrylate group is an acrylate group or a methacrylate group, preferably a methacrylate group.

Examples of the monomer having a cyclic hydrocarbon group include cyclohexyl methacrylate, t-butyl cyclohexyl methacrylate, benzyl methacrylate, isobornyl methacrylate, isobornyl acrylate, dicyclopentanyl methacrylate, dicyclopentanyl acrylate, dicyclopentenyl methacrylate, and dicyclopentenyl acrylate.

(D) Other Monomer(s)

Other monomer (D) other than the monomer (A), (B) and (C), for example, other fluorine-free non-crosslikable monomers may be used. Examples of the other monomer include ethylene, vinyl acetate, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate, and vinyl alkyl ether. Other monomer is not limited to these examples.

Other monomer may be a halogenated olefin (preferably free from a fluorine atom).

Preferably, the halogenated olefin is an olefin having 2-20 carbon atoms substituted by 1-10 chlorine atoms, bromine atoms or iodine atoms. Preferably, the halogenated olefin is a chlorinated olefin having 2-20 carbon atoms, especially, an olefin having 2-5 carbon atoms which has 1-5 chlorine atoms. Preferable examples of the halogenated olefin are a vinyl halide such as vinyl chloride, vinyl bromide and vinyl iodide; and vinylidene halide such as vinylidene chloride, vinylidene bromide and vinylidene iodide. Preferably, in the present invention, the halogenated olefin is not used, because the polymer may be able to adhere to a roll (a gum-up property might be worsen).

The other monomer may be a fluorine-free crosslinkable monomer. The fluorine-free crosslinkable monomer is a monomer which does not contain a fluorine atom. The fluorine-free crosslinkable monomer may be a compound which has at least two reactive groups and/or carbon-carbon double bonds, and which does not contain fluoride. The fluorine-free crosslinkable monomer may be a compound which has at least two carbon-carbon double bonds, or a compound which has at least one carbon-carbon double bond and at least one reactive group. Examples of the reactive group include a hydroxyl group, an epoxy group, a chloromethyl group, a blocked isocyanate group, an amino group and a carboxyl group.

The fluorine-free crosslinkable monomer may be a mono (meth)acrylate, di(meth)acrylate, or a mono-(meth)acrylamide which has a reactive group. Alternatively, the fluorine-free crosslinkable monomer may be di(meth)acrylate. One example of the fluorine-free crosslinkable monomer is a vinyl monomer having a hydroxyl group.

Examples of the fluorine-free crosslinkable monomer include diacetone (meth)acrylamide, N-methylol (meth)acrylamide, hydroxymethyl (meth)acrylate, hydroxyethyl (meth)acrylate, 3-chloro-2-hydroxypropyl (meth)acrylate, 2-acetoacetoxyethyl (meth)acrylate, butadiene, isoprene, chloroprene, vinyl monochloroacetate, vinyl methacrylate, glycidyl (meth)acrylate, 1,6-hexanediol di(meth)acrylate, and neopentyl glycol di(meth)acrylate, but the fluorine-free crosslinkable monomer are not limited to these examples.

Herein, the term "(meth)acrylate" means an acrylate or methacrylate, and the term "(meth)acrylamide" means an acrylamide or methacrylamide.

In the fluorine-containing polymer,
the amount of the monomer having a linear or branched hydrocarbon group (B) may be 1-1000 parts by weight, for example, 10-500 parts by weight, particularly 20-300 parts by weight, especially 50-200 parts by weight, and
the amount of the monomer having a cyclic hydrocarbon group (C) may be 1-1000 parts by weight, for example, 10-500 parts by weight, particularly 20-300 parts by weight, especially 50-200 parts by weight,
based on 100 parts by weight of the fluorine-containing monomer (A).

The amount of the other monomer (D) may be 500 parts by weight or less, for example, 1-200 parts by weight, based on 100 parts by weight of fluorine-containing monomer (A).

Generally, a number-average molecular weight (Mn) of the fluorine-containing polymer may be 1,000-1,000,000, for example, 5,000-500,000, especially 3,000-200,000. Generally, the number-average molecular weight (Mn) of the fluorine-containing polymer is measured by GPC (gel permeation chromatography).

In the present invention, the monomer (A) to (C) (and, if necessary, the other monomer (D)) are copolymerized to give obtain a fluorine-containing composition wherein the fluorine-containing polymer dispersed or dissolved in a medium.

The monomers may be polymerized in the presence of at least one compound selected from the group which consists of a blocked isocyanate compound and an organopolysiloxane compound. The amount of the blocked isocyanate compound (or the organopolysiloxane compound) may be 0-100 parts by weight, for example, 1-50 parts by weight, based on 100 parts by weight of monomers.

The fluorine-containing polymer having a blocked isocyanate group is obtained by polymerizing the monomers in the presence of the blocked isocyanate compound. The blocked isocyanate compound is an isocyanate blocked by at least one blocking agent. Examples of the blocking agent include oximes, phenols, alcohols, mercaptans, amides, imides, imidazole derivatives, ureas, amines, imines, pyrazoles, and active methylene compounds. Other examples of a blocking agent are pyridinols, thiophenols, diketones, and esters. The blocked isocyanate compound may be modified with a compound having a hydrophilic group.

The fluorine-containing polymer having a siloxane group is obtained by polymerizing monomers in the presence of an organopolysiloxane compound (for example, a mercapto-functional organopolysiloxane, and a vinyl-functional organopolysiloxane). In one embodiment, the mercapto-functional organopolysiloxane comprises siloxy units having the average formula:

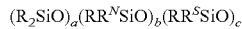

$(R_2SiO)_a(RR^NSiO)_b(RR^SSiO)_c$ wherein a is 0-4000, alternatively 0 to 1000, alternatively 0 to 400,
b is 1-1000, alternatively 1 to 100, alternatively 1 to 50,
c is 1-1000, alternatively 1 to 100, alternatively 1 to 50;
R is independently a monovalent organic group,
alternatively R is a hydrocarbon containing 1-30 carbon atoms,
alternatively R is a monovalent alkyl group containing 1-12 carbons, or
alternatively R is a methyl group;
$R^N$ is a monovalent amino-functional organic group, and
$R^S$ is a monovalent mercapto-functional organic group.

The amino-functional organic group $R^N$, which is an organic functional group, is illustrated by groups having the formula: $-R^1NHR^2$, $-R^1NR^2_2$, or $-R^1NHR^1NHR^2$, wherein each $R^1$ is independently a divalent hydrocarbon group having at least 2 carbon atoms, and $R^2$ is hydrogen or an alkyl group having 1 to 10 carbon atoms. Each $R^1$ is typically an alkylene group having from 2 to 20 carbon atoms.

Some examples of suitable amino-functional hydrocarbon groups are; $-CH_2CH_2NH_2$, $-CH_2CH_2CH_2NH_2$, $-CH_2CHCH_3NH$, $-CH_2CH_2CH_2CH_2NH_2$, $-CH_2CH_2CH_2CH_2CH_2NH_2$, $-CH_2CH_2CH_2CH_2CH_2CH_2NH_2$, $-CH_2CH_2NHCH_3$, $-CH_2CH_2CH_2NHCH_3$, $-CH_2(CH_3)CHCH_2NHCH_3$, $-CH_2CH_2CH_2CH_2NHCH_3$, $-CH_2CH_2NHCH_2CH_2NH_2$, $-CH_2CH_2CH_2NHCH_2CH_2CH_2NH_2$, $-CH_2CH_2CH_2CH_2NHCH_2CH_2CH_2NH_2$, $-CH_2CH_2NHCH_2CH_2NHCH_3$, $-CH_2CH_2CH_2NHCH_2CH_2CH_2NHCH_3$, $-CH_2CH_2CH_2CH_2NHCH_2CH_2CH_2CH_2NHCH_3$, and $-CH_2CH_2NHCH_2CH_2NHCH_2CH_2CH_3$. Typically, the amino-functional group is $-CH_2CH_2CH_2NH_2$.

$R^S$ is illustrated by groups having the formula: $-R^1SR^2$, wherein each $R^1$ is independently a divalent hydrocarbon group having at least 2 carbon atoms, and $R^2$ is hydrogen or an alkyl group having 1 to 10 carbon atoms. The mercapto-functional group is illustrated by the following formulae; $-CH_2CH_2CH_2SH$, $-CH_2CHCH_3SH$, $-CH_2CH_2CH_2CH_2SH$, $-CH_2CH_2CH_2CH_2CH_2SH$, $-CH_2CH_2CH_2CH_2CH_2CH_2SH$, and $-CH_2CH_2SCH_3$. Typically, the mercapto-functional group is $-CH_2CH_2CH_2SH$.

The fluorine-containing polymer of the present invention can be produced by any of conventional polymerization methods, and the polymerization condition can be optionally selected. The polymerization method includes, for example, a solution polymerization, a suspension polymerization and an emulsion polymerization.

In a solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of total of the monomers.

The organic solvent is inert to the monomer(s) and dissolves the monomer(s), and examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 2,000 parts by weight, for example, from 50 to 1,000 parts by weight, based on 100 parts by weight of total of the monomers.

In the emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators such as benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate; and oil-soluble initiators such as azobisisobutyronitrile, benzoyl peroxide, di-tert-butyl peroxide, lauryl peroxide, cumene hydroperoxide, t-butyl peroxypivalate and diisopropyl peroxydicarbonate can be used. The polymerization initiator may be used in the amount within the range from 0.01 to 10 parts by weight based on 100 parts by weight of the monomers.

In order to obtain a polymer dispersion in water, which is superior in storage stability, it is preferable that the monomers are dispersed in water by using an emulsifying device capable of applying a strong shearing energy (e.g., a high-pressure homogenizer and an ultrasonic homogenizer) and then polymerized with using the oil-soluble polymerization initiator. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The anionic emulsifying agent and/or the cationic emulsifying agent and/or the nonionic emulsifying agent are preferable. When the monomers are not completely compatibilized, a compatibilizing agent capable of sufficiently compatibilizing them (e.g., a water-soluble organic solvent and a low-molecular weight monomer) is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer are methyl methacrylate, glycidyl methacrylate, and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

The fluorine-containing composition of the present invention is preferably in the form of a solution, an emulsion (especially an aqueous dispersion) or an aerosol. The fluorine-containing composition generally comprises the fluorine-containing polymer (an active component of the surface treatment agent) and a medium (particularly a liquid medium, for example, an organic solvent and/or water). The amount of the medium may be 5 to 99.9% by weight, especially 10 to 80% by the weight, based on the fluorine-containing composition.

The concentration of the fluorine-containing polymer in the fluorine-containing composition may be from 0.01 to 95% by weight, for example, from 5 to 50% by weight.

The fluorine-containing composition can be applied to a substrate to be treated by a known procedure. Usually, the fluorine-containing composition is diluted or dispersed with an organic solvent or water, is adhered to surfaces of the substrate by a well-known procedure such as an immersion coating, a spray coating and a foam coating, and is dried. If necessary, the fluorine-containing composition is applied together with a suitable crosslinking agent, followed by curing. It is also possible to add mothproofing agents, softeners, antimicrobial agents, flame retardants, antistatic agents, paint fixing agents, crease-proofing agents, etc. to the fluorine-containing composition of the present invention. For the immersion coating, the concentration of the fluorine-containing polymer in the treatment liquid contacted with the substrate may be from 0.01 to 10% by weight, for example, 0.05 to 10% by weight, based on the treatment liquid.

The substrate to be treated with the fluorine-containing composition (for example, a water- and oil-repellent agent) of the present invention include a textile, masonry, a filter (for example, an electrostatic filter), a dust protective mask, a part of fuel cell (for example, a gaseous diffusion electrode and a gaseous diffusion support), glass, paper, wood, leather, fur, asbestos, brick, cement, metal and oxide, ceramics, plastics, a coated surface and a plaster. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers.

The textile may be any of a form of a fiber, a cloth, etc.

The fluorine-containing composition of the present invention can be used also as an internal mold release agent or an external release agent.

The fluorine-containing polymer can be applied to fibrous substrates (such as textiles) by any known method to treat textiles in liquid. When the textile is a cloth, the cloth may be immersed in the solution or the solution may be adhered or sprayed to the cloth. The treated textiles are dried, preferably heated at a temperature between 100° C. and 200° C. in order to develop the oil repellency.

Alternatively, the fluorine-containing polymer can be applied to a textile via a cleaning process, such as in a laundry application or dry cleaning process.

The textile which is treated is typically a fabric, including woven, knitted and nonwoven fabrics, fabrics in garment form and carpet, but may also be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric product of the present invention is particularly effective in rendering cellulosic fibres such as cotton or rayon oleophobic and oil repellent. The method of the present invention generally also renders the textile hydrophobic and water repellent.

Alternatively, the fibrous substrate can be a leather. The polymeric product can be applied to leather from aqueous solution or emulsion at various stages of leather processing, for example during leather wet end processing or during leather finishing, to render the leather hydrophobic and oleophobic. The fibrous substrate can alternatively be paper. The polymeric product can be applied to preformed paper or at various stages of papermaking, for example during drying of the paper.

The term "treatment" means that the treatment agent is applied to the substrate by immersion, spray, coating or the like. The fluorine-containing polymer which is an active component of the treatment agent can penetrate the internal of the substrate or can adhere on the surface of the substrate by the treatment.

EXAMPLES

The present invention is now described in detail by way of Examples. However, the present invention is not limited to these Examples.

In the following Examples, parts, % and ratio are parts by weight, % by weight and weight ratio, unless otherwise specified.

The procedures of the tests were performed in the following manner.

Shower Water Repellency Test

Shower water repellency test was conducted according to JIS-L-1092. The shower water repellency was expressed by water repellency No. (as shown in the below-described Table 1).

A glass funnel which has a volume of at least 250 mL and a spray nozzle which can spray 250 mL of water for 20-30 seconds are used. A test piece frame is a metal frame having a diameter of 15 cm. Three sheets of a test piece having a size of about 20 cm×20 cm are prepared and the sheet is mounted on a test piece holding frame so that the sheet has no wrinkle. The center of the spray is located on the center of the sheet. Room temperature water (250 mL) is charged into the glass funnel and sprayed on the test piece sheet (for time of 25-30 seconds). The holding frame is removed from a stand, one edge of the holding frame is grasped so that a front surface is downside and the other edge is lightly hit with a stiff substance. The holding frame is further rotated 180° and the same procedure is repeated to drop excess water droplets. The wet test piece is compared with a wet comparison standard to grade 0, 50, 70, 80, 90 and 100 points in order of poor water repellency to excellent water repellency. The results are obtained from an average of three measurements.

TABLE 1

| Water repellency No. | State |
| --- | --- |
| 100 | No wet or water droplets adhesion on surface |
| 90 | No wet but small water droplets adhesion on surface |
| 80 | Separate small water droplets-like wet on surface |
| 70 | Wet on half of surface and separate small wet which penetrates fabric |
| 50 | Wet on whole surface |
| 0 | Wet on front and back whole surfaces |

Strong Water Repellency Test

A test piece frame is a frame made of metal or resin having a diameter of 15 cm. Three test piece sheets each having a size of about 20 cm×20 cm are prepared and the sheet is mounted on a test piece holding frame so that the sheet has no wrinkle. Water is showered at a flow rate of 10 L/minute at 45 degrees upward slant towards a center of the test piece from a place having a distance of 50 cm from the test piece. A water repellency state is evaluated after 5 seconds according to above-mentioned Table 1. The results are obtained from an average of three measurements.

Tackiness Test

After weighing 1 g of a fluorine-containing polymer solid on a metal plate and heating for 60° C. for 1 hour, tackiness when a finger is applied to a polymer portion and pulled apart is evaluated as follows:

Good: Tackiness is not felt at all.
Fair: Slight tackiness is felt.
Bad: Tackiness is felt.
Very bad: Strong tackiness is felt.

Preparative Example 1

Into a 500 mL reaction flask, $CF_3CF_2—(CF_2CF_2)_n—CH_2CH_2OCOC(Cl)=CH_2$ (n=2.0) (14.9 g), stearyl acrylate (13.47 g), isobornyl methacrylate (33.71 g), pure water (110 g), dipropyleneglycol monomethyl ether (18.62 g), distearyl dimethyl ammonium chloride (3.08 g), stearyl trimethyl ammonium chloride (0.87 g), polyoxyethylene lauryl ether (EO: 20) (EO indicates the number of ethylene oxide units) (2.1 g) and polyoxyethylene isotridecyl ether (EO: 3) (0.65 g) were charged and then emulsified and dispersed with supersonic wave while stirred at a temperature of 60° C. for 15 minutes. After the atmosphere in the autoclave was replaced with nitrogen, a solution of lauryl mercaptan (0.62 g), 2,2-azobis(2-amidinopropane)dihydrochloride (0.31 g) (hereafter referred to as V-50) and water (9 g) was added to conduct a reaction at 60° C. for 5 hours to obtain an aqueous dispersion of a polymer. A composition of the polymer was almost the same as a composition of the charged monomers.

Preparative Example 2

Into a 500 mL reaction flask, $CF_3CF_2—(CF_2CF_2)_n—CH_2CH_2OCOC(Cl)=CH_2$ (n=2.0) (14.9 g), stearyl acrylate (13.47 g), cyclohexyl methacrylate (33.71 g), pure water (110 g), dipropyleneglycol monomethyl ether (18.62 g), distearyl dimethyl ammonium chloride (3.08 g), stearyl trimethyl ammonium chloride (0.87 g), polyoxyethylene lauryl ether (EO: 20) (EO indicates the number of ethylene oxide units) (2.1 g) and polyoxyethylene isotridecyl ether (EO: 3) (0.65 g) were charged and then emulsified and dispersed with supersonic wave while stirred at a temperature of 60° C. for 15 minutes. After the atmosphere in the autoclave was replaced with nitrogen, a solution of lauryl mercaptan (0.62 g), 2,2-azobis(2-amidinopropane)dihydrochloride (0.31 g) (hereafter referred to as V-50) and water (9 g) was added to conduct a reaction at 60° C. for 5 hours to obtain an aqueous dispersion of a polymer. A composition of the polymer was almost the same as a composition of the charged monomers.

Preparative Example 3

Into a 500 mL reaction flask, $CF_3CF_2—(CF_2CF_2)_n—CH_2CH_2OCOC(Cl)=CH$, (n=2.0) (31.04 g), stearyl acrylate (8.69 g), isobornyl methacrylate (22.34 g), pure water (110 g), dipropyleneglycol monomethyl ether (18.62 g), distearyl dimethyl ammonium chloride (3.08 g), stearyl trimethyl ammonium chloride (0.87 g), polyoxyethylene lauryl ether (EO: 20) (EO indicates the number of ethylene oxide units) (2.1 g) and polyoxyethylene isotridecyl ether (EO: 3) (0.65 g) were charged and then emulsified and dispersed with supersonic wave while stirred at a temperature of 60° C. for 15 minutes. After the atmosphere in the autoclave was replaced with nitrogen, a solution of lauryl mercaptan (0.62 g), 2,2-azobis(2-amidinopropane)dihydrochloride (0.31 g) (hereafter referred to as V-50) and water (9 g) was added to conduct a reaction at 60° C. for 5 hours to obtain an aqueous dispersion of a polymer. A composition of the polymer was almost the same as a composition of the charged monomers.

Preparative Example 4

Into a 500 mL reaction flask, $CF_3CF_2—(CF_2CF_2)_n—CH_2CH_2OCOC(Cl)=CH_2$ (n=2.0) (31.04 g), stearyl acrylate (8.69 g), cyclohexyl methacrylate (22.34 g), pure water (110 g), dipropyleneglycol monomethyl ether (18.62 g), distearyl dimethyl ammonium chloride (3.08 g), stearyl trimethyl ammonium chloride (0.87 g), polyoxyethylene lauryl ether (EO: 20) (EO indicates the number of ethylene oxide units) (2.1 g) and polyoxyethylene isotridecyl ether (EO: 3) (0.65 g) were charged and then emulsified and dispersed with supersonic wave while stirred at a temperature of 60° C. for 15 minutes. After the atmosphere in the autoclave was replaced with nitrogen, a solution of lauryl mercaptan (0.62 g), 2,2-azobis(2-amidinopropane)dihydrochloride (0.31 g) (hereafter referred to as V-50) and water (9 g) was added to conduct a reaction at 60° C. for 5 hours to obtain an aqueous dispersion of a polymer. A composition of the polymer was almost the same as a composition of the charged monomers.

Comparative Preparative Example 1

Into a 500 mL reaction flask, $CF_3CF_2$—$(CF_2CF_2)_n$—$CH_2CH_2OCOC(CH_3)$=$CH_2$ (n=2.0) (14.9 g), stearyl acrylate (13.47 g), isobornyl methacrylate (33.71 g), pure water (110 g), dipropyleneglycol monomethyl ether (18.62 g), distearyl dimethyl ammonium chloride (3.08 g), stearyl trimethyl ammonium chloride (0.87 g), polyoxyethylene lauryl ether (EO: 20) (EO indicates the number of ethylene oxide units) (2.1 g) and polyoxyethylene isotridecyl ether (EO: 3) (0.65 g) were charged and then emulsified and dispersed with supersonic wave while stirred at a temperature of 60° C. for 15 minutes. After the atmosphere in the autoclave was replaced with nitrogen, a solution of lauryl mercaptan (0.62 g), 2,2-azobis(2-amidinopropane)dihydrochloride (0.31 g) (hereafter referred to as V-50) and water (9 g) was added to conduct a reaction at 60° C. for 5 hours to obtain an aqueous dispersion of a polymer. A composition of the polymer was almost the same as a composition of the charged monomers.

Comparative Preparative Example 2

Into a 500 mL reaction flask, $CF_3CF_2$—$(CF_2CF_2)_n$—$CH_2CH_2OCOC(CH_3)$=$CH_2$ (n=2.0) (14.9 g), stearyl acrylate (43.46 g), pure water (110 g), dipropyleneglycol monomethyl ether (18.62 g), distearyl dimethyl ammonium chloride (3.08 g), stearyl trimethyl ammonium chloride (0.87 g), polyoxyethylene lauryl ether (EO: 20) (EO indicates the number of ethylene oxide units) (2.1 g) and polyoxyethylene isotridecyl ether (EO: 3) (0.65 g) were charged and then emulsified and dispersed with supersonic wave while stirred at a temperature of 60° C. for 15 minutes. After the atmosphere in the autoclave was replaced with nitrogen, a solution of lauryl mercaptan (0.62 g), 2,2-azobis(2-amidinopropane)dihydrochloride (0.31 g) (hereafter referred to as V-50) and water (9 g) was added to conduct a reaction at 60° C. for 5 hours to obtain an aqueous dispersion of a polymer. A composition of the polymer was almost the same as a composition of the charged monomers.

Example 1

After diluting the aqueous liquid prepared in Preparative Example 1 with pure water to give a fluorine-containing polymer solid content of 30%, the 30% dilution liquid was further diluted with water to prepare 0.50%, 0.75%, and 1.00% of a test liquid (1000 g) so that the 30% dilution liquid gives a concentration of 0.50%, 0.75% and 1.00%. The 0.50% and 0.75% test liquids were used in the shower water repellency test. The 1.00% test liquid was used in the strong water repellency test. One PET cloth (510 mm×205 mm) was dipped in this test liquid, and the cloth was passed through a mangle and treated in a pin tenter at 160° C. for 2 minutes. Then, the test cloth was subjected to the shower water repellency test, the strong water repellency test and the tackiness test. The results are shown in Table A.

Examples 2-4 and Comparative Examples 1-2

The polymers prepared in Preparative Examples 2-4 and Comparative Preparative Examples 1-2 were treated in the same manner as in Example 1 and subjected to the shower water repellency test, the strong water repellency test, and the tackiness test. The results are shown in Table A.

The meanings of abbreviations in the table are as follows:

| Abbr. 1 | Abbr. 2 | Compound name or Chemical formula |
|---|---|---|
| FCL | 13FCIA | $C_6F_{13}CH_2CH_2OCOC(Cl)$=$CH_2$ |
| FM | 13FMA | $C_6F_{13}CH_2CH_2OCOC(CH_3)$=$CH_2$ |
| IB | IBMA | isobornyl methacrylate |
| CH | CHMA | cyclohexyl methacrylate |
| S | StA | $C_{18}H_{37}OCOCH$=$CH_2$ |

TABLE A

| | | Ex. 1 | | Ex. 2 | | Ex. 3 | | Ex. 4 | | Com. Ex. 1 | | Com. Ex. 2 | |
|---|---|---|---|---|---|---|---|---|---|---|---|---|---|
| | | Preparative Example | | | | | | | | | | | |
| | | Pre. Ex. 1 | | Pre. Ex. 2 | | Pre. Ex. 3 | | Pre. Ex. 4 | | Com. Pre. Ex. 1 | | Com. Pre. Ex. 2 | |
| | | Monomer (Weight ratio) | | | | | | | | | | | |
| | | FCL/S/IB = 30/20/50 | | FCL/S/CH = 30/20/50 | | FCL/S/IB = 50/14/36 | | FCL/S/CH = 50/14/36 | | FM/S/IB = 30/20/50 | | FCL/S = 30/70 | |
| Shower water repellency test | Treatment conc. PET | 0.50% 90 | 0.75% 100 | 0.50% 90 | 0.75% 100 | 0.50% 90 | 0.75% 100 | 0.50% 90 | 0.75% 100 | 0.50% 70 | 0.75% 90 | 0.50% 70 | 0.75% 90 |
| Strong water repellency test | PET 1.00% | 100 | | 100 | | 100 | | 100 | | 0 | | 80 | |
| Tackiness test | | Good | | Good | | Good | | Good | | Bad | | Good | | cates the number of ethylene oxide units) (2.1 g) and polyoxyethylene isotridecyl ether (EO: 3) (0.65 g) were charged and then emulsified and dispersed with supersonic wave while stirred at a temperature of 60° C. for 15 minutes. After the atmosphere in the autoclave was replaced with

INDUSTRIAL APPLICABILITY

The fluorine-containing composition of the present invention can be used to give excellent water repellency, oil repellency, and antifouling property to a textile (for example, a carpet), a paper, a nonwoven fabric, a masonry, an electrostatic filter, a dust protective mask, and a part of a fuel cell.

The invention claimed is:

1. A fluorine-containing composition comprising a fluorine-containing polymer which consists essentially of:
   (A) repeating units formed from a fluorine-containing monomer which is alpha-chloroacrylate having a fluoroalkyl group,
   (B) repeating units formed from a (meth)acrylate monomer which is free from a fluoroalkyl group and which has a linear or branched hydrocarbon group, and
   (C) repeating units formed from a (meth)acrylate monomer which is free from a fluoroalkyl group and which has a cyclic hydrocarbon group,
   wherein the monomer (B) having a linear or branched hydrocarbon group is an acrylate of the formula:

$CH_2=CA_1COOA_2$ wherein $A^1$ is a hydrogen atom or a methyl group, and $A^2$ is an alkyl group represented by $C_nH_{2n+1}$ where n is 1-30,
   wherein the fluorine-containing polymer is free from repeating units formed from a halogenated olefin, and
   wherein the monomer (A) is a fluorine-containing monomer represented by the formula:

$CH_2=C(-Cl)-C(=O)-Y-Z-Rf$ wherein
   Y is —O;
   Z is a direct bond or divalent organic group; and
   Rf is a fluoroalkyl group having 1 to 20 carbon atoms.

2. The fluorine-containing composition according to claim 1, wherein the cyclic hydrocarbon group is saturated, in the cyclic hydrocarbon group-containing (meth)acrylate monomer (C).

3. The fluorine-containing composition according to claim 1, wherein the cyclic hydrocarbon group has 4-20 carbon atoms, in the cyclic hydrocarbon group-containing (meth)acrylate monomer (C).

4. The fluorine-containing composition according to claim 1, wherein a carbon atom in a ring of the cyclic hydrocarbon group is directly bonded to an ester group in a (meth)acrylate group, in the cyclic hydrocarbon group-containing (meth)acrylate monomer (C).

5. The fluorine-containing composition according to claim 1, wherein the cyclic hydrocarbon group is at least one selected from the group consisting of a cyclohexyl group, a t-butyl cyclohexyl group, an isobornyl group, a dicyclopentanyl group and a dicyclopentenyl group, in the cyclic hydrocarbon group-containing (meth)acrylate monomer (C).

6. The fluorine-containing composition according to claim 1, wherein the cyclic hydrocarbon group-containing (meth)acrylate monomer (C) is at least one selected from the group consisting of cyclohexyl methacrylate, t-butyl cyclohexyl methacrylate, benzyl methacrylate, isobornyl methacrylate, isobornyl acrylate, dicyclopentanyl methacrylate, dicyclopentanyl acrylate, dicyclopentenyl acrylate, adamantyl acrylate and adamantyl methacrylate.

7. The fluorine-containing composition according to claim 1, which also contains an aqueous medium.

8. The fluorine-containing composition according to claim 1, which is an aqueous dispersion.

9. A water- and oil-repellent agent which is the fluorine-containing composition according to claim 1.

10. A fluorine-containing polymer which consists essentially of repeating units formed from:
    (A) a fluorine-containing monomer which is alpha-chloroacrylate having a fluoroalkyl group,
    (B) a (meth)acrylate monomer which is free from a fluoroalkyl group and which has a linear or branched hydrocarbon group, and
    (C) a (meth)acrylate monomer which is free from a fluoroalkyl group and which has a cyclic hydrocarbon group,
    wherein the monomer (B) having a linear or branched hydrocarbon group is an acrylate of the formula:

$CH_2=CA_1COOA_2$ wherein $A^1$ is a hydrogen atom or a methyl group, and $A^2$ is an alkyl group represented by $C_nH_{2n+1}$ where n is 1-30,
    wherein the fluorine-containing polymer is free from repeating units formed from a halogenated olefin, and
    wherein the monomer (A) is a fluorine-containing monomer represented by the formula:

$CH_2=C(-Cl)-C(=O)-Y-Z-Rf$ wherein
    Y is —O;
    Z is a direct bond or divalent organic group; and
    Rf is a fluoroalkyl group having 1 to 20 carbon atoms.

11. A method of treating a substrate, which comprises treating the substrate with the fluorine-containing composition according to claim 1.

12. A textile treated with the fluorine-containing composition according to claim 1.

13. A fluorine-containing composition comprising a fluorine-containing polymer which consists essentially of:
    (A) repeating units formed from a fluorine-containing monomer which is alpha-chloroacrylate having a fluoroalkyl group,
    (B) repeating units formed from a (meth)acrylate monomer which is free from a fluoroalkyl group and which has a linear or branched hydrocarbon group,
    (C) repeating units formed from a (meth)acrylate monomer which is free from a fluoroalkyl group and which has a cyclic hydrocarbon group, and
    (D) repeating units formed from a fluorine-free crosslinkable monomer which is a compound having at least two reactive groups and/or carbon-carbon double bonds,
    wherein the monomer (B) having a linear or branched hydrocarbon group is an acrylate of the formula:

$CH_2=CA_1COOA_2$ wherein $A^1$ is a hydrogen atom or a methyl group, and $A^2$ is an alkyl group represented by $C_nH_{2n+1}$ where n is 1-30,
    wherein the fluorine-containing polymer is free from repeating units formed from a halogenated olefin, and
    wherein the monomer (A) is a fluorine-containing monomer represented by the formula:

$CH_2=C(-Cl)-C(=O)-Y-Z-Rf$ wherein
    Y is —O;
    Z is a direct bond or divalent organic group; and
    Rf is a fluoroalkyl group having 1 to 20 carbon atoms.

14. The fluorine-containing composition according to claim 13, wherein the monomer (D) is at least one selected from the group consisting a mono(meth)acrylate having at least one reactive group, a mono-(meth)acrylamide having at least one reactive group and a di(meth)acrylate.

15. The fluorine-containing composition according to claim 1, wherein the cyclic hydrocarbon group in the (meth) acrylate monomer (C) is a saturated or unsaturated, bridged ring group.

16. The fluorine-containing composition according to claim 1, wherein the amount of the monomer having a linear or branched hydrocarbon group (B) is 1-1000 parts by weight, and
    the amount of the monomer having a cyclic hydrocarbon group (C) is 1-1000 parts by weight,
    based on 100 parts by weight of the fluorine-containing monomer (A).

17. The fluorine-containing polymer according to claim 10, wherein the amount of the monomer having a linear or branched hydrocarbon group (B) is 1-1000 parts by weight, and
    the amount of the monomer having a cyclic hydrocarbon group (C) is 1-1000 parts by weight,
    based on 100 parts by weight of the fluorine-containing monomer (A).

18. The fluorine-containing composition according to claim 13, wherein the amount of the monomer having a linear or branched hydrocarbon group (B) is 1-1000 parts by weight,
    the amount of the monomer having a cyclic hydrocarbon group (C) is 1-1000 parts by weight, and
    the amount of the fluorine-free crosslinkable monomer (D) is 1-200 parts by weight,
    based on 100 parts by weight of the fluorine-containing monomer (A).

* * * * *